United States Patent
Marmorstein et al.

(10) Patent No.: US 7,524,191 B2
(45) Date of Patent: Apr. 28, 2009

(54) SYSTEM AND METHOD FOR LANGUAGE INSTRUCTION

(75) Inventors: Jack A. Marmorstein, Harrisonburg, VA (US); Gregory A. Keim, Harrisonburg, VA (US); Eugene H. Stoltzfus, Keezletown, VA (US); Duane M. Sider, Harrisonburg, VA (US); Allen G. Stolzfus, Iowa City, IA (US); John R. Stolzfus, legal representative, Iowa City, IA (US)

(73) Assignee: Rosetta Stone Ltd., Harrisonburg, VA (US)

( * ) Notice: Subject to any disclaimer, the term of this patent is extended or adjusted under 35 U.S.C. 154(b) by 324 days.

(21) Appl. No.: 10/652,620

(22) Filed: Sep. 2, 2003

(65) Prior Publication Data

US 2005/0048449 A1    Mar. 3, 2005

(51) Int. Cl.
G09B 11/00 (2006.01)
(52) U.S. Cl. .................. 434/157; 434/169
(58) Field of Classification Search ............ 434/322, 434/323, 362, 365, 157, 169, 185, 350
See application file for complete search history.

(56) References Cited

U.S. PATENT DOCUMENTS

| | | |
|---|---|---|
| 3,946,504 A | 3/1976 | Nakano |
| 4,112,595 A | 9/1978 | Fernandez et al. |
| 4,128,737 A | 12/1978 | Dorais |
| 4,247,995 A | 2/1981 | Heinberg |
| 4,333,152 A | 6/1982 | Best |
| 4,406,001 A | 9/1983 | Klasco et al. |
| 4,406,626 A | 9/1983 | Anderson et al. |
| 4,443,199 A | 4/1984 | Sakai |
| 4,613,309 A | 9/1986 | McCloskey |
| 4,615,680 A | 10/1986 | Tomatis |
| 4,710,877 A | 12/1987 | Ahmed |
| 4,864,620 A | 9/1989 | Bialick |
| 4,884,972 A | 12/1989 | Gasper |
| 4,891,011 A | 1/1990 | Cook |
| 5,010,495 A | 4/1991 | Willetts |
| 5,065,317 A | 11/1991 | Hiramatsu et al. |
| 5,065,345 A | 11/1991 | Knowles et al. |

(Continued)

FOREIGN PATENT DOCUMENTS

WO    WO 03/017229 A1    2/2003

OTHER PUBLICATIONS

Auld, G., The Role of the Computer in Learning NDJ BBANA, Language Learning & Technology, 6(2):41-58 (2002), http://llt.msu.edu/vol6num2/auld/.

(Continued)

*Primary Examiner*—Kathleen Mosser
(74) *Attorney, Agent, or Firm*—McDermott Will & Emery LLP

(57) ABSTRACT

A system and method for language instruction is provided. In an embodiment, a method of language instruction is provided which comprises presenting a first description of an event responsive to a first perspective and presenting a second description of the event responsive to a second perspective, wherein the first description of the event and the second description of the event are in a common language. The first and second descriptions of the event can be provided in a variety of formats, such as in audio format or as text.

24 Claims, 4 Drawing Sheets

U.S. PATENT DOCUMENTS

| | | |
|---|---|---|
| 5,145,376 A | 9/1992 | Krass |
| 5,170,362 A | 12/1992 | Greenberg et al. |
| 5,191,617 A | 3/1993 | Bolin et al. |
| 5,197,883 A | 3/1993 | Johnston |
| 5,203,705 A | 4/1993 | Hardy et al. |
| 5,267,865 A | 12/1993 | Lee et al. |
| 5,273,433 A | 12/1993 | Kaminski et al. |
| 5,275,569 A | 1/1994 | Watkins |
| 5,286,205 A | 2/1994 | Inouye et al. |
| 5,293,584 A | 3/1994 | Brown et al. |
| 5,302,132 A | 4/1994 | Corder |
| 5,307,442 A | 4/1994 | Abe et al. |
| 5,315,689 A | 5/1994 | Kanazawa et al. |
| 5,340,316 A | 8/1994 | Javkin et al. |
| 5,393,236 A | 2/1995 | Blackmer et al. |
| 5,421,731 A | 6/1995 | Walker |
| 5,453,014 A | 9/1995 | Hendriks |
| 5,486,111 A | 1/1996 | Watkins |
| 5,487,671 A | 1/1996 | Shpiro et al. |
| 5,503,560 A | 4/1996 | Stentiford |
| 5,529,496 A | 6/1996 | Barrett |
| 5,540,589 A | 7/1996 | Waters |
| 5,557,706 A | 9/1996 | Geist |
| 5,562,453 A | 10/1996 | Wen |
| 5,634,086 A | 5/1997 | Rtischev et al. |
| 5,649,826 A | 7/1997 | West et al. |
| 5,692,906 A | 12/1997 | Corder |
| 5,697,789 A | 12/1997 | Sameth et al. |
| 5,717,818 A | 2/1998 | Nejime et al. |
| 5,717,828 A | 2/1998 | Rothenberg |
| 5,727,951 A | 3/1998 | Ho et al. |
| 5,729,694 A | 3/1998 | Holzrichter et al. |
| 5,730,603 A | 3/1998 | Harless |
| 5,735,693 A | 4/1998 | Groiss |
| 5,766,015 A | 6/1998 | Shpiro |
| 5,771,212 A | 6/1998 | Park |
| 5,799,276 A | 8/1998 | Komissarchik et al. |
| 5,810,599 A | 9/1998 | Bishop |
| 5,822,720 A | 10/1998 | Bookman et al. |
| 5,857,173 A | 1/1999 | Beard et al. |
| 5,882,202 A | 3/1999 | Sameth et al. |
| 5,884,263 A | 3/1999 | Aaron et al. |
| 5,885,083 A | 3/1999 | Ferrell |
| 5,888,071 A | 3/1999 | Takamori |
| 5,895,446 A | 4/1999 | Takeda et al. |
| 5,920,838 A | 7/1999 | Mostow et al. |
| 5,957,699 A | 9/1999 | Peterson et al. |
| 5,995,932 A | 11/1999 | Houde |
| 6,017,219 A | 1/2000 | Adams, Jr. et al. |
| 6,071,123 A | 6/2000 | Tallal et al. |
| 6,077,085 A | 6/2000 | Parry et al. |
| 6,134,529 A | 10/2000 | Rothenberg |
| 6,163,769 A | 12/2000 | Acero et al. |
| 6,164,971 A * | 12/2000 | Figart ..................... 434/154 |
| 6,178,397 B1 | 1/2001 | Fredenburg |
| 6,198,904 B1 | 3/2001 | Rosen |
| 6,224,383 B1 | 5/2001 | Shannon |
| 6,227,863 B1 | 5/2001 | Spector |
| 6,234,802 B1 | 5/2001 | Pella et al. |
| 6,275,789 B1 | 8/2001 | Moser et al. |
| 6,302,695 B1 | 10/2001 | Rtishchev et al. |
| 6,305,942 B1 * | 10/2001 | Block et al. ................ 434/156 |
| 6,325,630 B1 | 12/2001 | Grabmayr |
| 6,341,958 B1 | 1/2002 | Zilberman |
| 6,356,865 B1 | 3/2002 | Franz et al. |
| 6,358,054 B1 | 3/2002 | Rothenberg |
| 6,370,498 B1 | 4/2002 | Flores et al. |
| 6,385,568 B1 | 5/2002 | Brandon et al. |
| 6,397,185 B1 | 5/2002 | Komissarchik et al. |
| 6,438,515 B1 | 8/2002 | Crawford et al. |
| 6,468,084 B1 | 10/2002 | MacMillan |
| 6,517,351 B2 | 2/2003 | Spector |
| 6,565,358 B1 | 5/2003 | Thomas |
| 6,625,608 B1 | 9/2003 | Watanabe |
| 6,632,096 B1 | 10/2003 | Sumimoto |
| RE38,432 E | 2/2004 | Fai et al. |
| 6,704,699 B2 | 3/2004 | Nir |
| 6,704,710 B2 | 3/2004 | Strong |
| 6,714,911 B2 | 3/2004 | Waryas et al. |
| 6,725,198 B2 | 4/2004 | Waryas et al. |
| 6,729,882 B2 | 5/2004 | Noble |
| 6,736,642 B2 * | 5/2004 | Bajer et al. ................. 434/236 |
| 6,741,833 B2 | 5/2004 | McCormick et al. |
| 6,782,356 B1 | 8/2004 | Lopke |
| 6,790,044 B1 | 9/2004 | Hagebarth |
| 6,793,498 B1 | 9/2004 | Nunes |
| 6,796,798 B1 | 9/2004 | Sanocki |
| 6,801,888 B2 | 10/2004 | Hejna, Jr. |
| 6,801,893 B1 | 10/2004 | Backfried et al. |
| 6,801,912 B2 | 10/2004 | Moskowitz et al. |
| 2001/0041328 A1 * | 11/2001 | Fisher ....................... 434/157 |
| 2002/0128814 A1 | 9/2002 | Brandon et al. |
| 2003/0006969 A1 * | 1/2003 | Barras ....................... 345/169 |
| 2003/0023420 A1 | 1/2003 | Goodman |
| 2003/0040899 A1 | 2/2003 | Ogilvie |
| 2003/0152904 A1 | 8/2003 | Doty, Jr. |

OTHER PUBLICATIONS

Betz, J.A., Social Dimensions of Telecollaborative Foreign Language Study1, Language Learning & Technology, 6(1):60-81 (2002), http://llt.msu/edu/vol6num1/belz/.

Blake, D., Language Skills and Learning Strategies, Language Skills and Learning Strategies, 1-8 (2003), ttp://public.sit.edu/students/pages/versluys/skillsstrategies.html.

Boada, A. B., School language and demosociolinguistic context in francophone children and young adults in Canada outside of Quebec: a warning for the Catalan situation, Noves SL. Revista de Sociolinguistica, Sociolinguistica internacional, 1-10 (2002), http://cultura.gencat.net/llengscat/noves.

Boudreau, C. et al., The Foreign Language Acquisition System of Project Orbis: An Example of Educational, Customizable Language Exposure in a Shared Virtual Environment, The Foreign Language Acquisition System of Project Orbis, 1-10 (2003), http://context.mit.edu/imediat98/paper1/.

McHenry, T., Words As Big as the Screen: Native American Languages and the Internet, Language Learning & Technology, 6(2):102-115 (2002), http://llt.msu.edu/vol6num2/mchenry/default.html.

Parks, S. et al., Crossing Boundaries: Multimedia Technology and Pedagogical Innovation in a High School Class, Language Learning & Technology, 7(1):28-45 (2003), http://llt.msu.edu/vol7num1/parks/default.html.

Transparent Language Learning Software, Translation Software, 1-3, at http://www.transparent.com (Oct. 14, 2004).

PCT/US2004/028218; Notification of Transmittal of the International Search Report and the Written Opinion of the International Searching Authority, or the Declaration; Data of mailing Nov. 6, 2005.

PCT/US2004/028216; Notification Concerning Transmittal of Copy of International Preliminary Report on Patentability (Chapter 1 of the Patent Cooperation Treaty); Date of mailing Mar. 9, 2006.

* cited by examiner

SYSTEM AND METHOD FOR LANGUAGE INSTRUCTION

BACKGROUND OF THE INVENTION

1. Field of the Invention

This invention generally relates to foreign language instruction, and more particularly to systems and methods for teaching foreign language by using immersion techniques.

2. Related Art

An increasingly important aspect of a person's education is the learning of foreign languages. Various methodologies exist for teaching foreign languages. Common classroom techniques include the memorization of vocabulary words and grammatical rules, and the translation of common phrases from the learner's native language to the foreign language and vice versa. For example, a student may be provided with a series of words or phrases in the foreign language and be required to memorize those words and phrases, and their equivalents in the student's native language. Moreover, a student may be presented with a variety of grammatical rules and be tested on the application of those rules in various contexts.

Although a foreign language may be learned in this way, it is often very difficult and time-consuming, and requires significant commitment on behalf of the student. Even if a student learns a foreign language in this way, he or she may have a limited grasp of the language, and may have difficultly communicating with native speakers of the language in common situations.

Immersion techniques have been developed to improve the teaching and learning of foreign languages. Simply stated, immersion techniques involve "immersing" students in the foreign language, thereby attempting to replicate the process by which students learned their native language, but in a systematic way. Thus, students learn a language by listening to speakers of the language associate words with objects, concepts and actions. Immersion techniques recognize that most people learned their native language by observing those speaking the language, and that the learning of grammatical rules and the like came much later than fluency in the language. Thus, in language immersion techniques, memorization and the learning of grammatical rules are typically de-emphasized.

In most language immersion techniques, the student's native language is essentially removed from the equation. The speaker does not learn, for example, that "der Hund" in German means "the dog" in English. Rather, the student hears that "der Hund" is associated with a particular animal and learns the connection between that word and the object with which it is associated. This is considered to be a far more natural way to learn a language and it is believed to be more effective than traditional classroom techniques.

Computer software programs have been developed which employ, at least to some extent, language immersion techniques. These programs can be utilized with conventional personal computers having both a visual display (such as a computer screen) and an audio component (such as a speaker). These programs conventionally employ some degree of multi-media presentation, with at least some interactivity with the user. For example, such programs may provide a still picture or video component in which an object is displayed or video footage of a certain event is presented on the computer screen. In conjunction with the visual display, the foreign language may be audibly presented. For example, when a picture of a dog is presented on the screen, the audio component of a German language instruction program may present the user with a recorded native speaker saying "der Hund." In addition, the "script" of the recorded audio message may be presented on the screen. Thus, in a text box on the computer screen, the words "der Hund" may be presented.

Conventionally in such systems, only a single a foreign word is presented for each concept or idea. Thus, for example, German synonyms of the word "der Hund" would not be presented. Additionally, when a more complicated situation is presented, that situation is described from only a single perspective. For example, a video component may be presented of an individual asking for directions to the airport, and another individual responding with the appropriate directions. This interaction will be described from a single perspective, either from the perspective of the first or second individual, or from the perspective of a third party narrator describing the interaction. Additionally, the program may simply present the actual dialogue of the two individuals, similar to the script from a play. However, such programs do not present foreign language descriptions of the event from more than one perspective.

Also, in many such programs, a translation of the foreign word(s) to the student's native language are often presented on the screen. Thus, the English words "the dog" may be provided in another text box on the computer screen when the German words "der Hund" are presented.

Many language instruction programs provide some interactivity with the user to assist the user in learning the foreign language. One common technique is providing certain questions about the object or event depicted and the corresponding foreign language description. Thus, a video component may be presented showing an interaction involving asking for directions to the airport. A question may be presented to the user to assess the user's understanding of the foreign language—for example, "Is the airport on the left or right?" The user may be rewarded with points for correctly answering the question.

While the above-described programs may provide a student with some of the benefits of language immersion, because the native language translation is readily available, and any foreign language descriptions of the object or event are not depicted from additional perspectives, many students use the native language translation as a "crutch" and fail to get the full benefits of the immersion technique.

Thus, a need exists for an immersion-based language instruction system and method in which an event or object is described from a variety of perspectives in order to facilitate the comprehension of a foreign language.

SUMMARY OF THE INVENTION

The present invention provides a system and method for language instruction. In one embodiment, a method of language instruction is provided which comprises presenting a first description of an event responsive to a first perspective, and presenting a second description of the event responsive to a second perspective, wherein the first description of the event and the second description of the event are in a common language. The first and second descriptions of the event can be provided in a variety of formats. For example, they can be provided in audio format such that an audio recording of the first description is played and is followed by an audio recording of the second description. Alternatively, the first and second descriptions could be displayed as text, for example, on a computer screen. In addition, a video component could be provided that displays a video presentation of the event.

In another embodiment, the present invention provides a description presentation apparatus which may comprise a visual event presentation area, a first text presentation area, and a second text presentation area. The visual presentation apparatus may display a visual representation of an event in the visual event presentation area, a first text description of the event in the first text presentation area and a second text description of the event in the second text presentation area. The first text description of the event is responsive to a first perspective of the event and the second text description of the event is responsive to a second perspective of the event. Both the first text description of the event and the second text description of the event are in a common language. In other embodiments, additional text descriptions may be provided.

The perspective from which the description of the event is provided may be the perspective of one of the participants of the event depicted in the visual event presentation area. Other perspectives may include a narration perspective or a dialogue perspective.

BRIEF DESCRIPTION OF THE FIGURES

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Figure 1:
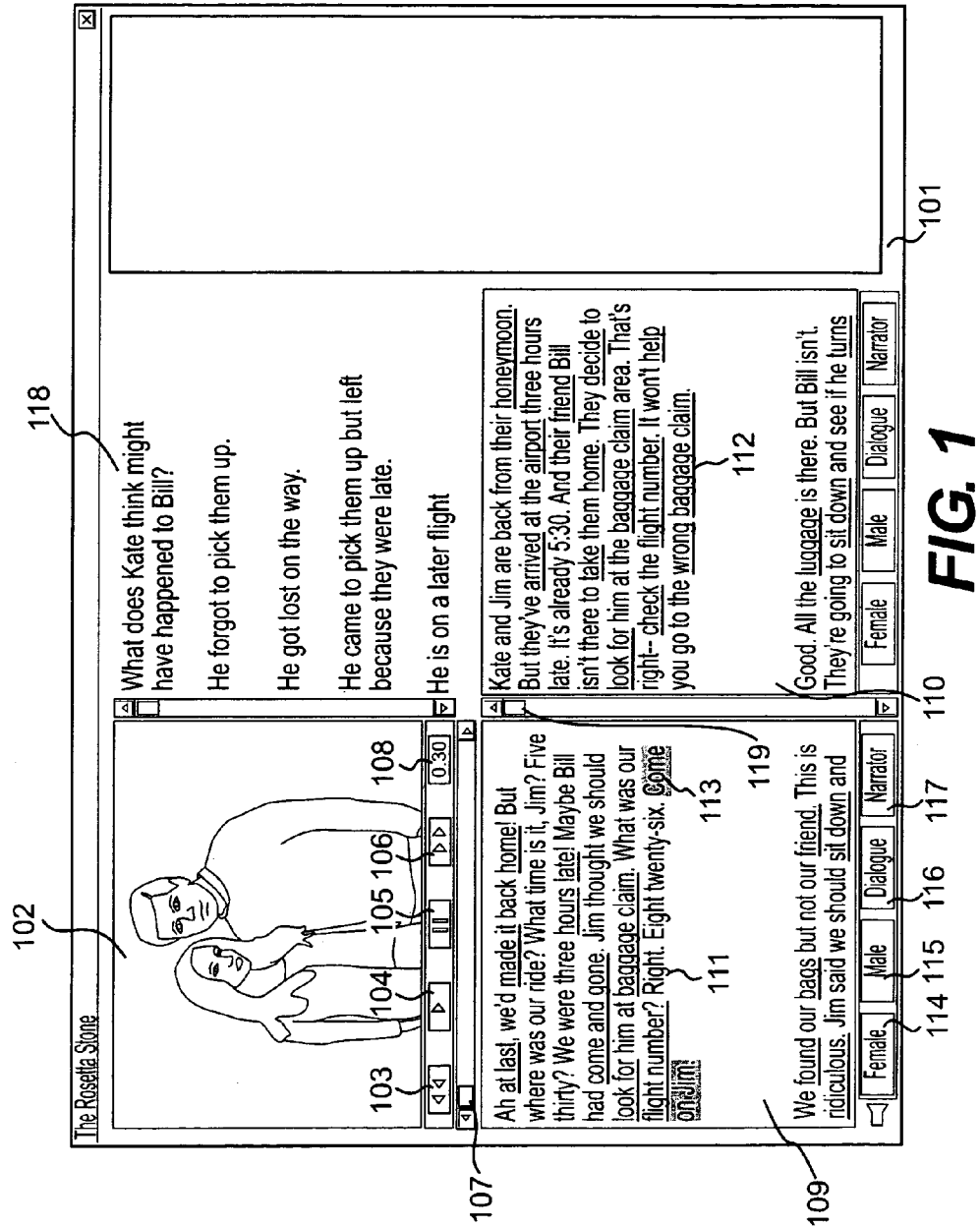
FIG. 1 is a representation of a display apparatus according to an embodiment of the present invention.

Reference will now be made in detail to preferred embodiments of the invention, examples of which are illustrated in some of the drawings. The figures, description and examples below are not meant to limit the scope of the present invention or its embodiments or equivalents.

As a general matter, it is believed that providing descriptions in a foreign language of a particular event from more than one perspective enhances the ability of language students to learn the foreign language in an immersion context. As described above, with most conventional language learning programs, a single foreign language text description is presented to the user and is associated with a particular event that is visually displayed. Because only a single foreign language description of the event is presented, if the user does not understand some of the words in that description, he or she must resort to the translation of that text description in the user's native language. This reliance on the translation takes the user out of the immersion context, and thus the user loses the advantages associated with the immersion technique.

An embodiment of the present invention overcomes this problem by presenting descriptions of the event to the user from at least two different perspectives. Thus, if the user does not understand a particular word in the first description, he or she can go on the second description to see if he or she can understand that description. For example, if the first description contains a word that the user does not understand, the second description may contain a synonym of that word which the user does understand. Also, the second description may allow the user to understand the first description by providing some context to the first description. In this way, the user will come to rely on the second description (which is also in the foreign language) rather than the native language translation of the first passage. Thus, the availability of the second description increases the likelihood that the user will remain in the immersion context, rather than resort to translation.

In addition to increasing the likelihood that the user remains in the immersion environment even when he or she encounters a difficult passage, the use of descriptions from more than one perspective serves to deepen the user's overall understanding of the language. For example, providing descriptions from different perspectives allows the user to encounter a variety of synonyms for a particular object or idea. It also allows the user to encounter a variety of syntaxes and sentence structures so that the user can learn the various ways that speakers of a language will attempt to get across the same or similar ideas.

Multiple descriptions may also allow the user to recognize idiomatic expressions. For example, one passage may say that "his car broke down." The user may not understand the phrase "broke down." However, the second passage may say "his car was not working," which the user may understand. Thus, he or she will be able to deduce that "broke down" is synonymous with "not working." Similarly, multiple perspectives may allow the user to recognize conversational fillers that are not really important to the meaning of the phrase, such as "like" and "and so on."

With multiple descriptions, the user may also encounter the same ideas expressed in different voices, for example, passive voice and active voice. The user may also see the different ways in which pronouns are used, or the differences between direct and indirect discourse, or the use of different tenses.

More generally stated, providing descriptions from a variety of perspectives is believed to reflect more accurately how conversations occur between native speakers of the language—they use a variety of syntaxes, synonyms, and idiomatic expression. Learning a variety of ways to say essentially the same thing is similarly considered to be critical to gaining a full understanding of a foreign language.

It should also be noted that the way in which the different descriptions are presented to the user of the present invention is not critical. For example, in the embodiments described below, the different descriptions are presented as visual text. However, the different descriptions may also be presented simply in audio form. Moreover, in the embodiments described below, a video showing an event is described. However, such a video is not necessary to this invention.

One embodiment of the present invention is shown in FIG. 1. FIG. 1 is a representation of a description presentation apparatus including a display apparatus 101 according to an embodiment of the present invention. Display apparatus 101 can be presented to a user who wishes to learn a language using a language immersion technique. Preferably, the display apparatus 101 is a conventional computer screen such that video footage of an event may be displayed to the user. However, the current invention is not limited to the computer or "multi-media" context. Thus, display apparatus 101 may simply be a piece of paper, such that the items described below may be presented in a book. Obviously, video could not be presented in such an embodiment, but still pictures of events could be. Either case is within the scope of this invention, as is any other medium that permits the displays contemplated by the present invention, including, but not limited to, cellular phones, personal digital assistants ("PDA's"), televisions, game consoles and the like.

Display apparatus 101 has a number of areas in which different items are displayed. One such area is visual event presentation area 102. In visual event presentation area 102, a visual representation of an event is presented. "Event," as used herein, is intended broadly to mean any action or series of actions, or any object, objects or the like that can be non-linguistically presented to a user. An event can be a series of interactions between two individuals, such as one individual asking another for directions to the airport. As used herein, an "individual" can include any language using entity, including, for example, human beings as well as fanciful characters such as cartoon characters and the like. An event can also include a still picture of any object, such as an animal, one or more individuals, or an inanimate object. Thus, visual event presentation area 102 contains a visual representation of such an event, such as motion video footage of two individuals interacting, or a still image of an object.

In an embodiment in which the present invention is implemented in a computer context and video footage of the event is presented in visual event presentation area 102, the user is provided with various controls over the video footage. For example, the user is able to rewind the video footage by clicking on button 103 in a manner apparent to one of ordinary skill in the art in view of the specification. Similarly, the user is able to play the video footage by clicking on button 104, pause the video footage by clicking on button 105, and fast-forward the video footage by clicking on button 106. Additionally, the user can go to a specific portion of the video footage by clicking on button 107 and dragging it to a specific portion of the footage in a manner well-known in the art. Timer 108 may be used to track specific points in time during the video footage.

A specific example of the video footage that may be presented in visual event presentation area 102 may be footage of two individuals exiting an airplane. These individuals may then appear to engage each other in conversation, in which one shows the other his watch. The individuals then walk to the baggage claim area of the airport, pick-up their bags, and sit down.

In addition to the visual event presentation area 102, the display apparatus 101 has a first text presentation area 109 and a second text presentation area 110. Displayed in the first text presentation area 109 is a first text description 111 of the event shown in the visual event presentation area, which is told from a particular perspective. If the event presented was the event described above regarding the two individuals exiting an airplane, the event could be described from the perspective of one of those individuals. Thus, the first text description 111 could be a description of the interaction from the point of view of one of the participants of the event. Thus, the first text description 111 presented in the first text presentation area 109 could read:

Ah, at last, we'd made it back home! But where was our ride? What time is it, Jim? Five thirty? We were three hours late! Maybe Bill had come and gone. Jim thought we should look for him at baggage claim. What was our flight number? Right. Eight twenty-six. Come on, Jim.
We found our bags but not our friend. This is ridiculous. Jim said we should go sit down and let Bill find us.

Similarly, the second text presentation area 110 presents a second text description 112 of the event, told from a different perspective than the first text description 110. Thus, for example, the second text description 112 could be told from the perspective of a narrator who is not depicted in the visual event presentation area, and could read:

Kate and Jim are back from their honeymoon. But they've arrived at the airport three hours late. It's already 5:30. And their friend Bill isn't there to take them home. They decide to look for him at the baggage claim area. That's right—check the flight number. It won't help you to go to the wrong baggage claim.
Good. All the luggage is there. But Bill isn't. They're going to sit down and see if he turns up. You never know.

Notably, the second text description 112 is in a common language with the first text description 110 (both in English) but told from a different perspective.

As can be seen in FIG. 1, first text presentation area 109 and second text presentation area 110 are located adjacent to one another. Preferably, the text presented in these areas line up, at least on a paragraph level. Thus, as shown in FIG. 1, the first paragraph of first text description 111 and the first paragraph of second text description 112 begin substantially on the same line; similarly, the second paragraph of each text description begins on substantially the same line.

Moreover, in the example depicted in FIG. 1, the first paragraphs of each text description contain descriptions of essentially the same concepts. Thus, in this example, the first sentence of first text description 111 reads, "Ah, at last, we'd made it back home!" The first sentence of second text description in this example 112 reads, "Kate and Jim are back from their honeymoon." These sentences express essentially the same meaning as told from different perspectives—the first, from the perspective of an individual participating in the event, and the second, from the perspective of a third party narrator.

It should be noted, however, that the text descriptions of embodiments of the present invention need not have corresponding meanings on a sentence by sentence basis. Thus, for example, the second sentences of these examples read respectively, "But where was our ride?" (from first text description 111) and "But they've arrived at the airport three hours late." (from second text description 112). These sentences do not express essentially the same meaning in the way that the above-described first sentences of the example expressed essentially the same meaning. While the text description need not have corresponding meanings on a sentence by sentence basis in embodiments they convey essentially corresponding ideas on a paragraph by paragraph basis. Thus, the paragraph as a whole in a text description conveys essentially the same meaning as the corresponding paragraph in a second text description. In the example described above (and depicted in FIG. 1), the first paragraphs in each text description convey the ideas that the individuals had arrived late from a trip and that they could not find the person who was supposed to pick them up.

Additionally, in conjunction with the display apparatus 101 shown in FIG. 1, an audio component could be provided, such as by a recorded voice that is played over a conventional audio speaker. In particular, the voice of an individual reading the text presented in first text presentation area 109 could be provided in conjunction with the video presented in visual event presentation area 102. (Alternatively, of course, the text provided in the second text presentation area 110, rather than the first text presentation area 109, could be provided in audio form.) For example, an audio presentation of the first paragraph of first text presentation 111 could occur when the video shows the two individuals exiting the airplane and engaging each other in conversation. The video and audio could then be synchronized such that the audio presentation of the second paragraph occurs when the video shows the two individuals moving to the baggage claim area and retrieving their bags. In other words, in embodiments of the present invention, the audio and video is synchronized such that the aspect of the event that is being described by the audio presentation corresponds with the aspect of the event that is shown in the video.

Additionally, the sentence of the first text description 111 that is being presented by the audio component is highlighted (see highlighting 113) in order to assist the user in following along with the audio.

In an embodiment, when audio is presented that is associated with a text description told from the point of view a particular participant in the event, the audio is voiced by a person of the same gender as the participant. This allows the user to hear words in the foreign language in diverse voices, thereby allowing the user to improve his or her understanding of the pronunciation of the foreign language.

In embodiments where the entire text description cannot fit into the respective text presentation area, such as in first text presentation area 109, the text will automatically "scroll" such that the visible text corresponds to the audio portion that is being played. In embodiments, even the text in the text presentation area that is not being presented in audio form scrolls in a similar manner, so that the two text presentation areas maintain their alignment, at least on a paragraph to paragraph level.

Furthermore, button 119 may be provided. By clicking on button 119, the user can scroll through the text to get to a specific portion of the text, and the corresponding video and/or audio. Additionally, a user can also move to a particular point in the text (with corresponding video and/or audio) by simply clicking on the desired portion of the text within the text presentation area.

In the embodiment depicted in FIG. 1, in addition to the two perspectives described above, the display apparatus 101 provides the user with ability to selectively display text descriptions from alternative perspectives. As shown in FIG. 1, first text presentation area 109 has a number of buttons 114-117. By clicking on one of the these buttons, the user can display the text associated with a particular perspective in first text presentation area.

By clicking on button 114, the user will display the text description from the perspective of one of the individuals participating in the event. This text description was described above, and is shown in text description 111.

By clicking on button 115, the user will display a different text description in first text presentation area 109. In this example the user will see a text description from the perspective of the other individual participating in the event. Thus, the following text description could appear in first text presentation area 109:

I was happy to be home. But Bill wasn't there. He was supposed to pick us up. The time? It was 5:30. Our flight was three hours late. "Hey," I said to Kate, "let's look for him at baggage claim." "Sure," said Kate. "But first check our flight number." Here it is: 826. Baggage claim 7. Let's go.

At least our bags were there. But we still didn't see Bill. "Well," I said to Kate, "We can't find Bill, so let Bill find us."

Similar to first text description 111 and second text description 112, this text description provides a description of the event shown in the video, and corresponds, at least on a paragraph by paragraph basis, to the general concepts in the first and second text descriptions 111 and 112.

Moreover, in embodiments in the present invention, where an audio component presents a recording of the text description, switching the text description in the first text presentation area 109 will switch the audio recording to correspond to that new text description, and the audio recording picks up the description at a point that roughly corresponds to where the previous audio portion left off. For example, in the embodiment depicted in FIG. 1, if the user clicks on button 115 just as the audio track completes the first paragraph of first text description 111, the audio track will begin on the second paragraph of the new text description (i.e., "At least our bags were there . . . ").

By clicking on button 116, the user will display still another text description of the event. This text description is preferably from the "dialogue" perspective. Thus, as used herein, "dialogue" can be a type of a "description" of an event. The dialogue perspective is essentially the direct dialogue between the participants in the event, similar to the script of a play. In this case, the direct dialogue text could be:

Kate: Oh, it's so good to be home!
Jim: Oh, it sure is.
Kate: Bill's not here to pick us up.
Jim: No, I don't see him.
Kate: What time is it, Jim?
Jim: Five thirty.
Kate: Five thirty? We're three hours late! Maybe he's been here and left.
Jim: Hey. Let's look for him at baggage claim.
Kate: Sure. But first check our flight number.
Jim: Oh, right. Here it is: 826. Baggage claim 7. Let's go.
Kate: Our luggage is all here, but I don't see Bill.
Jim: Well, we can't find Bill, so let Bill find us.

Again, this text description provides a description of the event shown in the video, and corresponds, at least on a paragraph by paragraph basis, to the general concepts in the other text descriptions.

Finally, by clicking button 117, the user will display the text description from the perspective of a third party narrator, as described above with respect to second text description 112.

In other embodiments, other descriptions of events from other perspectives may be appropriate. For example, if there are three participants in an event, a text description from each participant's perspective may be available.

Figure 2:
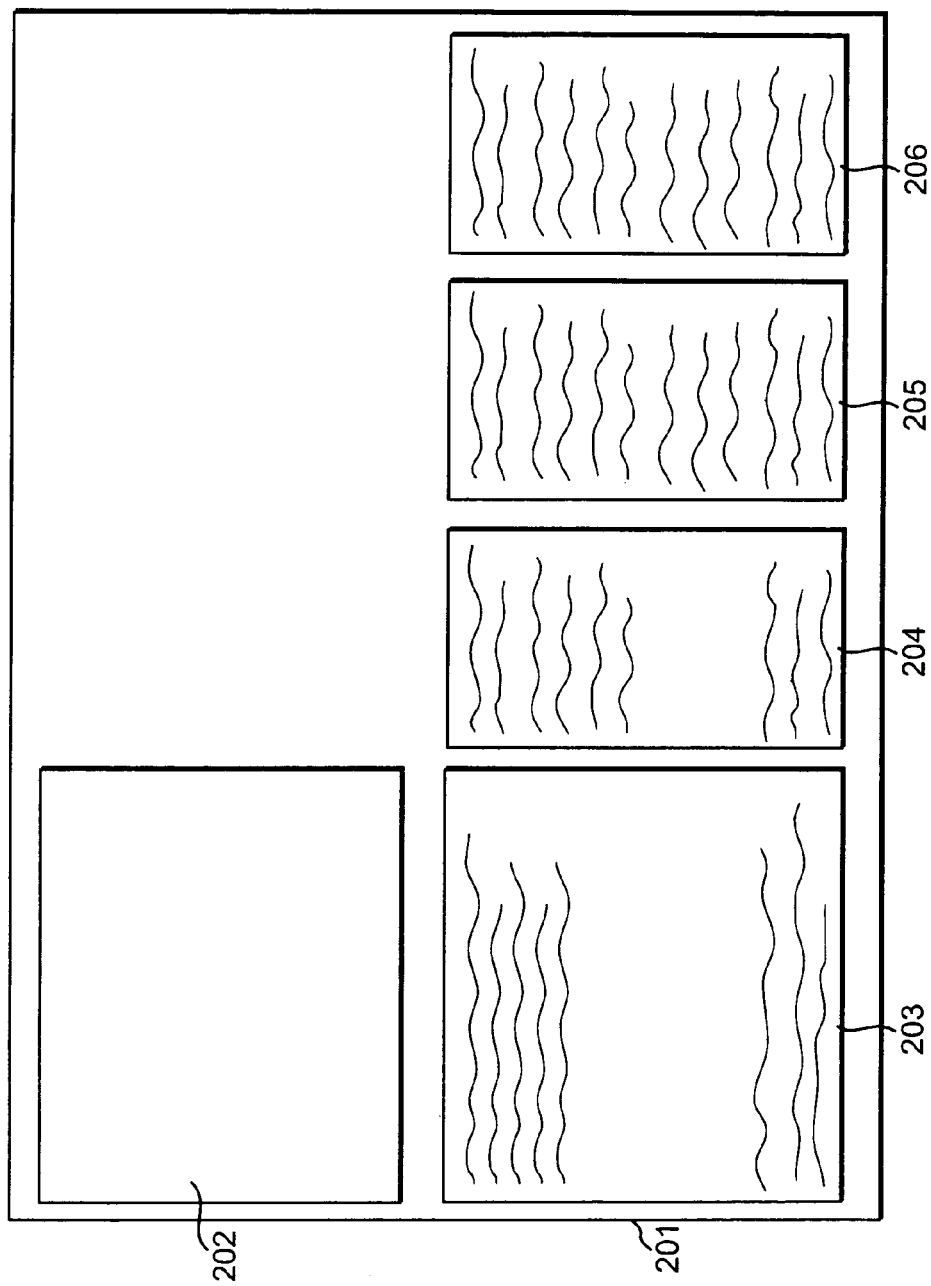
FIG. 2 is a representation of another display apparatus according to an embodiment of the present invention.

In addition, in some embodiments, more than two text boxes may be viewable at a given time. For example, in the embodiment depicted in FIG. 2, a display apparatus 201 is provided that is similar to display apparatus 101. Thus, display apparatus 201 contains a visual event presentation area 202 and is provided with four text presentation areas 203, 204, 205, and 206. Thus, for example, a user could simultaneously observe four text descriptions of the event told from four different perspectives.

Referring now again to FIG. 1, display apparatus 101 is provided with a question presentation area 118. Various questions may be presented to the user in question presentation area 118 to test the user's understanding of the event and the text and audio descriptions of the event. These questions may be presented in multiple choice, fill in the blank, true-false, or any other suitable format, which allows the user to input an answer, and the computer system to assess whether the answer is correct. Thus, the answer may be input by clicking on a single choice from a list of choices using a mouse or by using a computer keyboard as apparent to one of ordinary skill in the art in light of the specification.

In an embodiment, the ability to correctly answer at least some questions requires the user to understand at least two of the text descriptions. For example, the question may ask the user to assess the response of one of the participants to a request posed by another of the participants. This may require the user to understand the text description told from the first participant's perspective as well as the text description told from the second participant's perspective.

Figure 3:
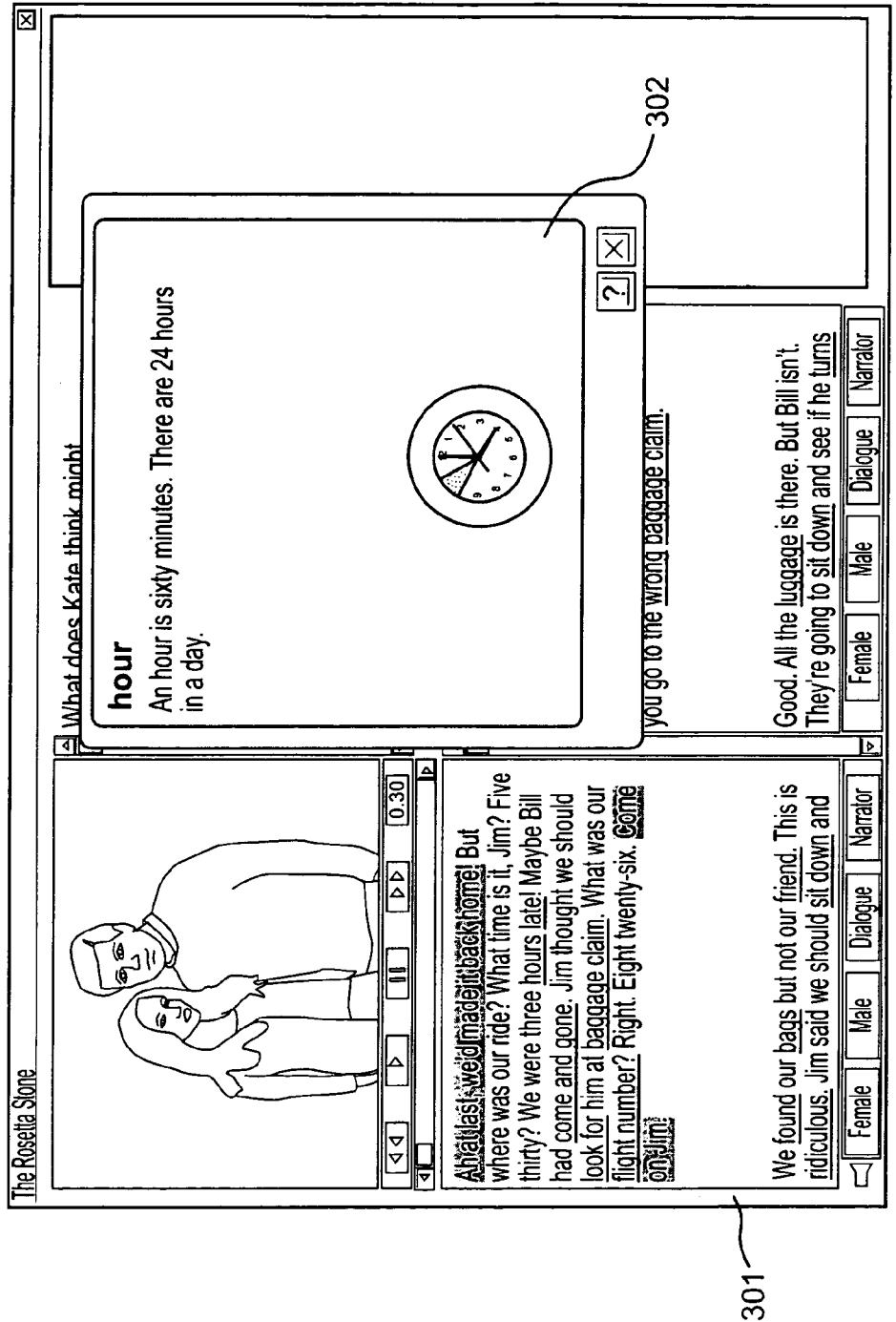
FIG. 3 is a representation of another display apparatus according to an embodiment of the present invention, in which a glossary feature is shown.

In another embodiment, a dictionary or glossary feature may also be provided. Thus, for certain words, the user may be able to click on that word, in a manner apparent to one of skill in the art in view of this specification, and receive a further explanation of the meaning of that word. An example is shown in FIG. 3. FIG. 3 shows a display apparatus 301 similar to display apparatus 101. If the user does not understand the word "hour" from the various text descriptions available, he or she can click on that word, and text box 302 will appear providing further explanation of the word. In an embodiment, this explanation may be provided in the same language as the text description. The explanation could also contain a translation of the word into the user's native language.

As described above with respect to FIG. 1, an embodiment of the present invention preferably comprises display apparatus 101 which has the ability to display a video of an event, as well as at least two text based descriptions of the event. In addition, an audio component provides a recording of a native speaker of the language speaking one of the text descriptions. Thus, this embodiment has a visual component, a text component, and an audio component. In embodiments of the present invention, one or more of these components may be selectively turned off. For example, a user may wish to test his or her ability to understand simply the spoken language. Thus, he or she may turn off the text display or even the video, and attempt to understand simply what is heard from the audio component. Similarly, a user may simply wish to test his or her reading comprehension and turn off the audio and/or video portion, leaving the text displayed. Finally, a user may wish to test his or her ability to pronounce the foreign language and turn off the audio portion.

Thus, as indicated above, in certain embodiments of the present invention, the descriptions of the event may be presented in audio form only, such that the user is presented with an audio recording of a description of an event told from a first perspective. The user may be presented with an audio recording of the event told from a second perspective. This audio presentation may occur in conjunction with the display of a video representation of the event, but need not.

As indicated above, an embodiment of the invention may be carried out in a computer environment. Thus, for example, a computer program product may be provided comprising a computer usable medium having computer logic recorded on the medium for instructing a computer to carry out the functions described above. For example, the computer can be instructed to display the video footage and the text descriptions described above, as well as provide the audio associated with one of the text descriptions.

Figure 4:
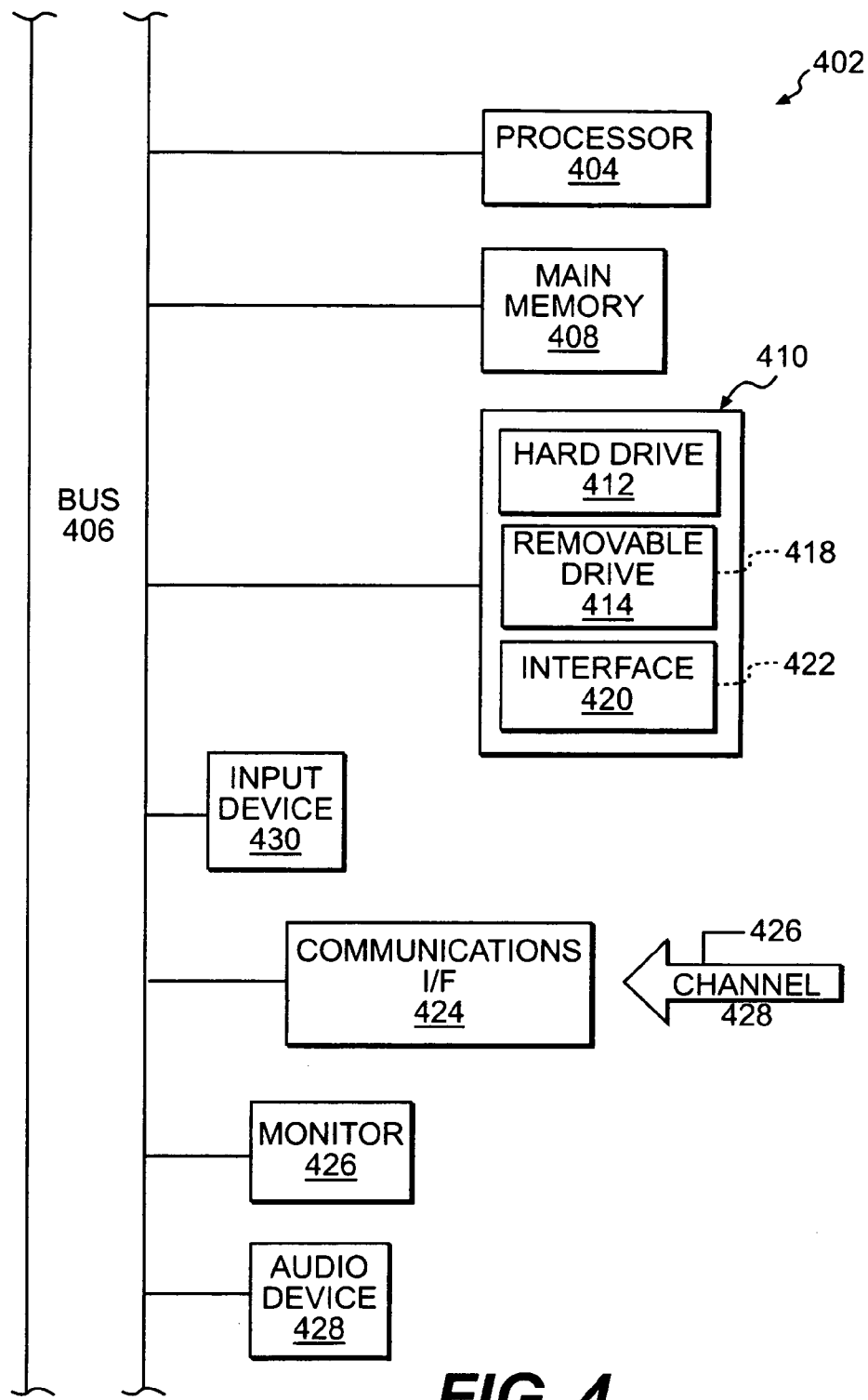
FIG. 4 is a block diagram of a computer system suitable for use with an embodiment of the present invention.

With reference now to FIG. 4, a description of a computer system suitable for use with an embodiment of the present invention is provided. The computer system 402 includes one or more processors, such as a processor 404. The processor 404 is connected to a communication bus 406.

The computer system 402 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. The removable storage unit 418, represents a floppy disk, magnetic tape, optical disk, CD-ROM, etc. which is read by and/or written to by the removable storage drive 414. As will be appreciated, the removable storage unit 418 includes a computer usable storage medium having stored therein computer software and/or data.

In alternative embodiments, the secondary memory 410 may include other similar means for allowing computer programs or other instructions to be loaded into the computer system 402. Such means can include, for example, a removable storage unit 422 and an interface 420. Examples of such can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 402.

The computer system 402 can also include a communications interface 424. The communications interface 424 allows software and data to be transferred between the computer system 402 and external devices. Examples of the communications interface 424 can include a modem, a network interface (such as an Ethernet card), a communications port, a PCMCIA slot and card, etc. Software and data transferred via the communications interface 424 are in the form of signals 426 that can be electronic, electromagnetic, optical or other signals capable of being received by the communications interface 424. Signals 426 are provided to communications interface via a channel 428. A channel 428 carries signals 426 and can be implemented using wire or cable, fiber optics, a phone line, a cellular phone link, an RF link and other communications channels.

In this specification, the term "computer-readable storage medium" is used to generally refer to media such as the removable storage device 418, a hard disk installed in hard disk drive 412. These media are means for providing sofware and operating instructions to the computer system 402

In the embodiment depicted in FIG. 4, computer programs (also called computer control logic) are stored in machine-readable medium, such as the main memory 408 and/or the secondary memory 410. Computer programs can also be received via the communications interface 424. Such machine-readable medium, when the computer programs stored thereon are executed, enable the computer system 402 to perform the features of the present invention as discussed herein.

In an embodiment where the invention is implemented using software, the software may be stored in a computer-readable storage medium and loaded into the computer system 402 using the removable storage drive 414, the hard drive 412 or the communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

Also coupled to communications bus 406 is a monitor 426. As described above, in embodiments of the present invention, a variety of items are displayed on a display apparatus. A conventional computer monitor, such as monitor 426 can serve as such a display apparatus. Thus, the computer program will cause the processor to display video footage, text descriptions and the like on monitor 426 where they can be viewed by the user.

In addition, audio device 428 is also coupled to communications bus 406. Audio device 428 can be any device that allows the computer system 402 to provide audible output, including for example, conventional speakers. Thus, the computer program will cause the processor to play the appropriate recorded audio track over the audio device 428.

Finally, input device 430 is coupled to communications bus 406. Input device 430 may be any number of devices that allow a user to input information into the computer system, including for example, a keyboard, a mouse, a microphone (for example interacting with voice recognition software), a stylus and the like.

Although particular embodiments of the invention have been described and illustrated herein, it is recognized that modifications and variations may readily occur to those skilled in the art and consequently it is intended that the claims be interpreted to cover such modifications and equivalents.

We claim:

1. A language instruction method comprising the machine-executed steps of:
   accessing data related to an event;
   providing a selection to solicit a user selection of a first description perspective of the event, wherein the first description perspective is one of a perspective of a first individual in the event, a perspective of a second individual in the event, and a narration of the event;
   receiving the user selection of the first description perspective of the event;
   presenting the event based on the accessed data; and
   presenting a first description of the event according to the user selection of the first description perspective of the event;
   providing a selection to solicit a user selection of a second description perspective of the event, wherein the second description perspective is different from the first description perspective;
   receiving the user selection of the second description perspective of the event; and
   presenting a second description of the event according to the user selection of the second description perspective of the event;
   wherein:
   the first description and the second description are in the same language, and
   if the first description of the event and the second description of the event are in text form, the first description of the event and the second description of the event are presented at the same time.

2. A language instruction method comprising the machine-executed steps of:
   accessing data related to an event;
   providing a selection to solicit a user selection of a first description perspective of the event, wherein the first description perspective is one of a perspective of a first individual in the event, a perspective of a second individual in the event, and a narration of the event;
   receiving the user selection of the first description perspective of the event;
   presenting the event based on the accessed data; and
   presenting a first description of the event according to the user selection of the first description perspective of the event;
   providing a selection to solicit a user selection of a second description perspective of the event, wherein the second description perspective is different from the first description perspective;
   receiving the user selection of the second description perspective of the event; and
   presenting a second description of the event according to the user selection of the second description perspective of the event;
   wherein;
   the first description and the second description are in the same language;
   the first description perspective is a perspective of the first individual in the event;
   the second description perspective is a perspective of the second individual in the event;
   the first description of the event and the second description of the event are in text form;
   the first description of the event is presented in a first display area; and
   the second description of the event is presented in a second display area adjacent to the first display area.

3. A language instruction method comprising the machine-executed step of:
   accessing data related to an event;
   providing a selection to solicit a user selection of a first description perspective of the event, wherein the first description perspective is one of a perspective of first individual in the event, a perspective of a second individual in the event, and a narration of the event;
   receiving the user selection of the first description perspective of the event;
   presenting the event based on the accessed data; and
   presenting a first description of the event according to the user selection of the first description perspective of the event;
   providing a selection to solicit a user selection of a second description perspective of the event, wherein the second description perspective is different from the first description perspective;
   receiving the user selection of the second description perspective of the event; and
   presenting a second description of the event according to the user selection of the second description perspective of the event;
   wherein:
   the first description and the second description are in the same language;
   the first description includes a first word; and
   the second description includes a second word which is synonym of the first word.

4. A language instruction method comprising the machine-executed steps of:
   accessing data related to an event;
   providing a selection to solicit a user description perspective of the event, wherein the first description perspective is one of a individual in the event, a perspective of a second individual in the event, and a narration of the event;
   receiving the user selection of the first description perspective of the event;
   presenting the event based on the accessed data; and
   presenting a first description of the event according to the user selection of the first description perspective of the event;
   providing a selection to solicit a user selection of a second description perspective of the event, wherein the second description perspective is different from the first description perspective;
   receiving the user selection of the second description perspective of the event; and presenting a second description of the event according to the user selection of the second description perspective the event;
wherein:
the first description and the second description are in the same language,
the first description includes a first phrase;
the second description includes a second phrase; and
one of the first phrase and the second phrase is an active voice, and the other of the first phrase and the second phrase is a passive voice.

5. A language instruction method comprising the machine-executed steps of:
accessing data related to an event;
providing a selection to solicit a user selection of a first description perspective of the event, wherein the first description perspective is one of a perspective of a first individual in the event, a perspective of a second individual in the event, and a narration of the event;
receiving the user selection of the first description perspective of the event;
presenting the event based on the accessed data; and
presenting a first description of the event according to the user selection of the first description perspective of the event;
providing a selection to solicit a user selection of a second description perspective of the event ,wherein the second description perspective is different from the first description perspective;
receiving the user selection of the second description perspective of the event; and
presenting a second description of the event according to the user selection of the second description perspective of the event;
wherein;
the first description and the second description are in the same language;
the first description includes a first phrase of a first tense; and
the second description includes a second phrase of a second tense different from the first tense.

6. A language instruction method comprising the machine-executed steps of:
accessing data related to an event;
providing a selection to solicit a user selection of a first description perspective of the event, wherein the first description perspective is one of a perspective of a first individual in the event, a perspective of a second individual in the event, and a narration of the event;
receiving the user selection of the first description perspective of the event;
presenting the event based on the accessed data; and
presenting a first description of the event according to the user selection of the first description perspective of the event;
providing a selection to solicit a user selection of a second description perspective of the event, wherein the second description perspective is different from the first description perspective;
receiving the user selection of the second description perspective of the event; and
presenting a second description of the event according to the user selection of the second description perspective of the event;
wherein:
the first description and the second description are in the same language, and
the second description includes an idiomatic expression corresponding to an expression in the first description.

7. A machine-readable medium storing instruction which, upon execution by a data processing system, control the data processings system to perform the machine-executed steps of:
accessing data related to an event;
providing a selection to solicit a user selection of a first description perspective of the event, wherein the first description perspective is one of a perspective of a first individual in the event, a perspective of a second individual in the event, and a narration of the event;
receiving the user selection first description perspective of the event;
presenting the event based on the accessed data; and
presenting a first description of the event according to the user selection of the first description perspective of the event;
providing a selection to solicit a user selection of a second description perspective of the event, wherein the second description perspective is different from the first description perspective;
receiving the user selection of the second description perspective of the event; and
presenting a second description of the event according user selection of the second description perspective of the event;
wherein;
the first description and the second description are in the same language; and
the first description perspective is a perspective of the first individual in the event;
the second description perspective is a perspective of the second individual in the event;
the first description of the event and the second description of the event are in text form;
the first description of the event is presented in a first display area; and
the second description of the event is presented in a second display area adjacent to the first display area.

8. A machine-readable medium storing instructions which, upon execution by a data processing system, control the data processing system to perform the machine-executed steps of:
accessing data related to an event;
providing a selection to solicit a user selection of a first description perspective of the event, wherein the first description perspective is one of a perspective of a first individual in the event, a perspective of a second individual in the event, and a narration of the event;
receiving the user selection of the first description perspective of the event;
presenting the event based on the accessed data; and
presenting a first description perspective of the event according to the user selection of the first description perspective of the event;
providing a selection to solicit a user selection of a second description perspective of the event, wherein the second description perspective is different from the first description perspective;
receiving the user selection of the second description perspective of the event; and
presenting a second description of the event according to the user selection of the second description perspective of the event;
wherein;
the first description and the second description are in the same language;

the first description perspective is a perspective of the first individual in the event;

the second description perspective is a perspective of the second individual in the event;

the first description of the event and the second description of the event are in text form;

the first description of the event is presented in a first display area; and the second description of the event is presented in a second display area adjacent to the first display area.

9. A machine-readable medium storing instructions which, upon execution by a data processing system, control the data processing system to perform the machine-executed step of:

accessing data related to an event;

providing a selection to solicit a user selection of a first description perspective of the event, wherein the first description perspective is one of a perspective of a first individual in the event, a perspective of a second individual in the event, and a narration of the event;

receiving the user selection of the first description perspective of the event;

presenting the event based on the accessed data; and presenting a first description of the event according to the user selection of the first description perspective of the event;

providing a selection to solicit a user selection of a second description perspective of the event, wherein the second description perspective is different from the first description perspective;

receiving the user selection of the second description perspective of the event; and presenting a second description of the event according to the user selection of the second description perspective of the event;

wherein:

the first description and the second description are in the same language;

the first description includes a first word; and the second description includes a second word that is a synonym of the first word.

10. A machine-readable medium storing instruction which, upon execution by a data processing system, control the data processing system to perform the machine-executed steps of:

accessing data related to an event;

providing a selection to solicit a user selection of a first description perspective of the event, wherein the first description perspective is one of a perspective of a first individual in the event, a perspective of a second individual in the event, and a narration of the event;

receiving the user selection of the first description perspective of the event;

presenting the event based on the accessed data; and presenting a first description of the event according to the user selection of the first description perspective of the event;

providing a selection to solicit a user selection of a second description perspective of the event, wherein the second description perspective is different from the first description perspective;

receiving the user selection of the second description perspective of the event; and presenting a second description of the event according to the user selection of the second description perspective of the event;

wherein:

the first description and the second description are in the same language;

the first description includes a first phrase;

the second description includes a second phrase; and one of the first phrase and the second phrase is an active voice, and the other of the first phrase and the second phrase is a passive voice.

11. A machine-readable medium storing instructions which, upon execution by a data processing system, control the data processing system to perform the machine-executed steps of:

accessing data related to an event;

providing a selection to solicit a user selection of a first description perspective of the event, wherein the first description perspective is one of a perspective of a first individual in the event, a perspective of a second individual in the event, and a narration of the event;

receiving the user selection of the first description perspective of the event;

presenting the event based on the accessed data; and presenting a first description of the event according to the user selection of the first description perspective of the event;

providing a selection to solicit a user selection of a second description perspective of the event, wherein the second description perspective is different from the first description perspective;

receiving the user selection of the second description perspective of the event; and presenting a second description of the event according to the user selection of the second description perspective of the event;

wherein:

the first description and the second description are in the same language;

the first description includes a first phrase of a first tense; and the second description includes a second phrase of a second tense different from the first tense.

12. A machine-readable medium storing instruction which, upon execution by a data processing system, control the data processing system to perform the machine-executed steps of:

accessing data related to an event;

providing a selection to solicit a user selection of a first description perspective of the event, wherein the first description perspective is one of a perspective of a first individual in the event, a perspective of a second individual in the event, and a narration of the event;

receiving the user selection of the first description perspective of the event;

presenting the event based on the accessed data; and presenting a first description of the event according to the user selection of the first description perspective of the event;

providing a selection to solicit a user selection of a second description perspective of the event, wherein the second description perspective is different from the first description perspective;

receiving the user selection of the second description perspective of the event; and presenting a second description of the event according to the user selection of the second description perspective of the event;

wherein:

the first description and the second description are in the same language; and the second description includes an idiomatic expression corresponding to an expression in the first description.

13. A data processing system comprising a data processor configured to excuted machine-readable instructions, the data processor, upon execution of instructions, controls the data processing system to perform the machine-executed steps of:
accessing data related to an event;
providing a selection to solicit a user selection of a first description perspective of the event, wherein the first description perspective is one of a perspective of a first individual in the event, a perspective of a second individual in the event, and a narration of the event;
receiving the user selection of the first description perspective of the event;
presenting the event based on the accessed data; and
presenting a first description of the event according the user selection of the first description perspective of the event;
providing a selection to solicit a user selection of a second description perspective of the event, wherein the second description perspective is different from the first description perspective;
receiving the user selection of the second description perspective of the event; and
presenting a second description of the event according to the user selection of the second description perspective of the event;
wherein:
the first description and the second description are in the same language; and
if the first description of the event and the second description of the event are in text form, the first description of the event and the second description of the event are presented at the same time.

14. A data processing system comprising a data processor configure to execute machine-readable instructions, the data processor, upon execution of instructions, controls the data processing system to perform the machine-executed steps:
accessing data related to an event;
providing a selection to solicit a user selection of a first description perspective of the event,wherein the first description perspective is one of a perspective of a first individual in the event, a perspective of a second individual in the event, and a narration of the event;
receiving the user selection of the first description perspective of the event;
presenting the event based on the accessed data; and
presenting a first description of the event according to the user selection of the first description perspective of the event;
providing a selection to solicit a user selection of a second description perspective of the event ,wherein the second description perspective is different from the first description perspective;
receiving the user selection of the second description perspective of the event; and
presenting a second description of the event according to the user selection of the second description perspective of the event;
wherein:
the first description and the second description are in the same language;
the first description perspective is a perspective of the first individual in the event;
the second description perspective is a perspective of the second individual in the event;
the first description of the event and the second description of the event are in text form;
the first description of the event is presented in a first display area; and
the second description of the event is presented in a second display area adjacent to the first display area.

15. A data processing system comprising a data processor configured to execute machine readable instructions, the data processor, upon execution of instructions, controls the data processing system to perform the machine-executed steps of:
accessing data related to an event;
providing a selection to solicit a user selection of a first description perspective of the event, wherein the first description perspective as one of a perspective of a first individual in the event, a perspective of a second individual in the event, and a narration of the event;
receiving the user selection of the first description perspective of the event;
presenting the event based on the accessed data; and
presenting a first description of the event according to the user selection of the first description perspective of the event;
providing a selection to solicit a user selection of a second description perspective of the event, wherein the second description perspective is different from the first description perspective;
receiving the user selection of the second description perspective of the event; and
presenting a second description of the event according to the user selection of the second description perspective of the event;
wherein:
the first description and the second description are in the same language;
the first description includes a first word; and
the second description includes a second word which is a synonym of the first word.

16. A data processing system comprising a data processor configured to execute machine-readable instructions, the data processor, upon execution of instructions, controls the data processing system to perform the machine-executed steps of:
accessing data related to an event;
providing a selection to solicit a user selection of a first description perspective of the event, wherein the first description perspective is one of a perspective of a first individual in the event, a perspective of a second individual in the event, and a narration of the event;
receiving the user selection of the first description perspective of the event;
presenting the event based on the accessed data; and
presenting a first description of the event according to the user selection of the first description perspective of the event;
providing a selection to solicit a user selection of a second description perspective of the event, wherein the second description perspective is different from the first description perspective;
receiving the user selection of the second description perspective of the event; and
presenting a second description of the event according to the user selection of the second description perspective of the event;
wherein;
the first description and the second description are in the same language;
the first description includes a first phrase;
the second description includes a second phrase; and
one of the first phrase and the second phrase is an active voice, and the other of the first phrase and the second phrase is a passive voice.

17. A data processing system comprising a data processor configured to execute machine-readable instructions, the data processor, upon execution of instructions, controls the data processing system to perform the machine-executed steps of:
- accessing data related to an event;
- providing a selection to solicit a user selection of a first description perspective of the event, wherein the first description perspective is one of a perspective of a first individual in the event, a perspective of a second individual in the event, and a narration of the event;
- receiving the user selection of the first description perspective of the event;
- presenting the event based on the accessed data; and
- presenting a first description of the event according to the user selection of the first description perspective of the event;
- providing a selection to solicit a user selection of a second description perspective of the event, wherein the second description perspective is different from the first description perspective;
- receiving the user selection of the second description perspective of the event; and
- presenting a second description of the event according to the user selection of the second description perspective of the event;
- wherein;
- the first description and the second description are in the same language;
- the first description includes a first phrase of a first tense; and
- the second description includes a second phrase of a second tense different from the first tense.

18. A data processing system comprising a data processor configured to execute machine-readable instructions, the data processor, upon execution of instructions, controls the data processing system to perform the machine-executed steps of:
- accessing data related to an event;
- providing a selection to solicit a user selection of a first description perspective of the event, wherein the first description perspective is one of a perspective of a first individual in the event, a perspective of a second individual in the event, and a narration of the event;
- receiving the user selection of the first description perspective of the event;
- presenting the event based on the accessed data; and
- presenting a first description of the event according to the user selection of the first description perspective of the event;
- providing a selection to solicit a user selection of a second description perspective of the event, wherein the second description perspective is different from the first description perspective;
- receiving the user selection of the second description perspective of the event; and
- presenting a second description of the event according to the user selection of the second description perspective of the event;
- wherein;
- the first description and the second description are in the same language; and
- the second description includes an idiomatic expression corresponding to an expression in the first description.

19. A system for providing language instruction comprising:
- means for accessing data related to an event;
- means for providing a selection to solicit a user selection of a first description perspective of the event, wherein the first description perspective is one of a perspective of a first individual in the event, a perspective of a second individual in the event, and a narration of the event;
- means for receiving the user selection of the first description perspective of the event;
- means for presenting the event based on the accessed data; and
- means for presenting a first description of the event according to the user selection of the first description perspective of the event;
- means for providing a selection to solicit a user selection of a second description perspective of the event, wherein the second description perspective is different from the first description perspective;
- means for receiving the user selection of the second description perspective of the event; and
- means for presenting a second description of the event according to the user selection of the second description perspective of the event;
- wherein;
- the first description and the second description are in the same language; and
- if the first description of the event and the second description of the event are in text form, the first description of the event and the second description of the event are presented at the same time.

20. A system for providing language instruction comprising:
- means for accessing data related to an event;
- means for providing a selection to solicit a user selection of a first description perspective of the event, wherein the first description perspective is one of a perspective of a first individual in the event, a perspective of a second individual on the event, and a narration of the event;
- means for receiving the user selection of the first description perspective of the event;
- means for presenting the event based on the accessed data; and
- means for presenting a first description of the event according to the user selection of the first description perspective of the event;
- means for providing a selection to solicit a user selection of a second description perspective of the event, wherein the second description perspective is different from the first description perspective;
- means for receiving the user selection of the second description perspective of the event; and
- means for presenting a second description of the event according to the user selection of the second description perspective of the event;
- wherein;
- the first description and the second description are in the same language;
- the first description perspective is a perspective of the first individual in the event;
- the second description perspective is a perspective of the second individual in the event;
- the first description of the event and the second description of the event are in text form;
- the first description of the event is presented in a first display area; and
- the second description of the event is presented in a second display area adjacent to the first display area.

21. A system for providing language instruction comprising:
- means for accessing data related to an event;

means for providing a selection to solicit a user selection of a first description perspective of the event, wherein the first description perspective is one of a perspective of a first individual in the event, a perspective of a second individual in the event, and a narration of the event;
means for receiving the user selection of the first description perspective of the event;
means for presenting the event based on the accessed data; and
means for presenting a first description of the event according to the user selection of the first description perspective of the event;
means for providing a selection to solicit a user selection of a second description perspective of the event, wherein the second description perspective is different from the first description perspective;
means for receiving the user selection of the second description perspective of the event; and
means for presenting a second description of the event according to the user selection of the second description perspective of the event;
wherein;
the first description and the second description are in the same language;
the first description includes a first word; and
the second description includes a second word which is a synonym of the first word.

22. A system for providing language instruction comprising:
means for accessing data related to an event;
means for providing a selection to solicit a user selection of a first description perspective of the event, wherein the first description perspective is one of a perspective of a first individual in the event, a perspective of a second individual in the event, and a narration of the event;
means for receiving the user selection of the first description perspective of the event;
means for presenting the event based on the accessed data; and
means for presenting a first description of the event according to the user selection of the first description perspective of the event;
means for providing a selection to solicit a user selection of a second description perspective of the event, wherein the second description perspective is different from the first description perspective;
means for receiving the user selection of the second description perspective of the event; and
means for presenting a second description of the event according to the user selection of the second description perspective of the event;
wherein;
the first description and the second description are in the same language;
the first description includes a first phrase;
the second description includes a second phrase; and
one of the first phrase and the second phrase is an active voice, and the other of the first phrase and the second phrase is a passive voice.

23. A system for providing language instruction comprising:
means for accessing data related to an event;
means for providing a selection to solicit a user selection of a first description perspective of the event, wherein the first description perspective is one of a perspective of a first individual in the event, a perspective of a second individual in the event, and a narration of the event;
means for receiving the user selection of the first description perspective of the event;
means for presenting the event based on the accessed data; and
means for presenting a first description of the event according to the user selection of the first description perspective of the event;
means for providing a selection to solicit a user selection of a second description perspective of the event, wherein the second description perspective is different from the first description perspective;
means for receiving the user selection of the second description perspective of the event; and
means for presenting a second description of the event according to the user selection of the second description perspective of the event;
wherein;
the first description and the second description are in the same language;
the first description includes a first phase of a first tense; and
the second description includes a second phrase of a second tense different from the first tense.

24. A system for providing language instruction comprising:
means for accessing data related to an event;
means for providing a selection to solicit a user selection of a first description perspective of the event, wherein the first description perspective is one of a perspective of a first individual in the event, a perspective of a second individual in the event, and a narration of the event;
means for receiving the user selection of the first description perspective of the event;
means for presenting the event based on the accessed data; and
means for presenting a first description of the event according to the user selection of the first description perspective of the event;
means for providing a selection to solicit a user selection of a second description perspective of the event, wherein the second description perspective is different from the first description perspective;
means for receiving the user selection of the second description perspective of the event; and
means for presenting a second description of the event according to the user selection of the second description perspective of the event;
wherein:
the first description and the second description are in the same language; and
the second description includes an idiomatic expression corresponding to an expression in the first description.

* * * * *